(12) United States Patent
Aoki

(10) Patent No.: US 10,933,890 B2
(45) Date of Patent: Mar. 2, 2021

(54) DRIVING ASSISTANCE DEVICE

(71) Applicant: TOYOTA JIDOSHA KABUSHIKI KAISHA, Toyota (JP)

(72) Inventor: Kazunari Aoki, Toyota (JP)

(73) Assignee: TOYOTA JTDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/733,830

(22) Filed: Jan. 3, 2020

(65) Prior Publication Data
US 2020/0239020 A1   Jul. 30, 2020

(30) Foreign Application Priority Data

Jan. 30, 2019 (JP) ................. 2019-014741

(51) Int. Cl.
| | |
|---|---|
| *B60W 50/14* | (2020.01) |
| *B60W 30/095* | (2012.01) |
| *B60W 30/06* | (2006.01) |
| *G08G 1/16* | (2006.01) |

(52) U.S. Cl.
CPC ............ *B60W 50/14* (2013.01); *B60W 30/06* (2013.01); *B60W 30/0956* (2013.01); *G08G 1/168* (2013.01); *B60W 2050/146* (2013.01); *B60W 2554/00* (2020.02); *B60W 2556/65* (2020.02)

(58) Field of Classification Search
CPC ...... B60W 50/14; B60W 30/06; B60W 30/08; B60W 30/0956; G08G 1/168; G08G 1/16

USPC ...... 340/435, 436, 438; 342/70; 701/70, 301
See application file for complete search history.

(56) References Cited

U.S. PATENT DOCUMENTS

| | | | | |
|---|---|---|---|---|
| 9,610,945 | B2* | 4/2017 | Miller | B60W 30/08 |
| 9,950,668 | B2* | 4/2018 | Nakagawa | G08G 1/09626 |
| 10,118,610 | B2* | 11/2018 | Deng | B60W 10/20 |
| 2018/0037262 | A1* | 2/2018 | Imai | G08G 1/0962 |

FOREIGN PATENT DOCUMENTS

| | | |
|---|---|---|
| JP | 2011-059946 A | 3/2011 |
| JP | 2011-113275 A | 6/2011 |
| JP | 2014-006609 A | 1/2014 |

* cited by examiner

*Primary Examiner* — Hung T Nguyen
(74) *Attorney, Agent, or Firm* — Sughrue Mion, PLLC

(57) ABSTRACT

A driving assistance device includes: an information receiver configured to receive information required for estimation of an other vehicle predicted route which is a predicted traveling route of another vehicle, from the other vehicle through wireless communication; and an electronic control unit configured to acquire a host vehicle predicted route which is a predicted travel route of a host vehicle, acquire the other vehicle predicted route; provide a warning to a driver of the host vehicle when the host vehicle predicted route and the other vehicle predicted route intersect each other, and prohibit the electronic control unit from providing the warning when determining that a predetermined parking lot traveling condition is satisfied, the predetermined parking lot traveling condition being a condition that is satisfied when the electronic control unit determines that the host vehicle is likely to be traveling in a parking lot.

6 Claims, 7 Drawing Sheets

DRIVING ASSISTANCE DEVICE

INCORPORATION BY REFERENCE

The disclosure of Japanese Patent Application No. 2019-014741 filed on Jan. 30, 2019 including the specification, drawings and abstract is incorporated herein by reference in its entirety.

BACKGROUND

1. Technical Field

The disclosure relates to a driving assistance device.

2. Description of Related Art

A driving assistance device (hereinafter, also referred to as "related device") determines whether there is another vehicle (vehicle on a collision path) that is likely to collide with a host vehicle, based on information about a traveling state of the other vehicle, which is received through vehicle-to-vehicle communication (i.e., wireless communication between vehicles) and information about a traveling state of the host vehicle. When determining that there is a vehicle on a collision path, the related device estimates a size of an intersection where a collision between the host vehicle and the vehicle on a collision path may occur. Furthermore, the related device starts issuing a warning at a timing before the host vehicle enters the intersection based on the size of the intersection (see Japanese Unexamined Patent Application Publication No. 2014-6609 (JP 2014-6609 A), for example).

SUMMARY

Whether there is a vehicle on a collision path is determined based on a predicted travel route of the host vehicle and a predicted travel route of the other vehicle. When the predicted route of the host vehicle and the predicted route of the other vehicle intersect each other, it is determined that the other vehicle is a vehicle on a collision path, and a point where those predicted routes intersect is determined as a predicted collision point.

The predicted route of the host vehicle is estimated based on a current position and traveling state (vehicle speed, traveling direction, etc.) of the host vehicle. The predicted route of the other vehicle is estimated based on the current position and traveling state of the other vehicle. However, the related device does not consider whether the host vehicle can actually travel along the predicted route of the host vehicle. Therefore, when the host vehicle is traveling in a parking lot, for example, a warning may be issued although a collision with the vehicle on a collision path cannot occur because of the presence of obstacles such as fences and wheel stops between the current position of the host vehicle and the predicted collision point. In that case, a driver may feel uncomfortable.

Thus, the disclosure provides a driving assistance device that can accurately determine whether a collision between the host vehicle and the other vehicle occurs based on information about the other vehicle, which is acquired through vehicle-to-vehicle communication, so as to reduce the frequency or possibility of issuance of an unnecessary warning.

One aspect of the disclosure relates to a driving assistance device. The driving assistance device includes: an information receiver configured to receive information required for estimation of an other vehicle predicted route, the other vehicle predicted route being a predicted traveling route of another vehicle, from the other vehicle through wireless communication; and an electronic control unit configured to acquire a host vehicle predicted route, the host vehicle predicted route being a predicted travel route of a host vehicle, based on information about a position of the host vehicle and a traveling state of the host vehicle, acquire the other vehicle predicted route based on the information received by the information receiver; provide a warning to a driver of the host vehicle when the host vehicle predicted route and the other vehicle predicted route intersect each other, and prohibit the electronic control unit from providing the warning when determining that a predetermined parking lot traveling condition is satisfied, the predetermined parking lot traveling condition being a condition that is satisfied when the electronic control unit determines that the host vehicle is likely to be traveling in a parking lot.

When the host vehicle is traveling in the parking lot, another vehicle (another vehicle with communication capabilities) traveling on a road near the parking lot may be extracted as the vehicle on a collision path. However, in many cases, a part of the parking lot other than an entrance/exit is separated from the road near the parking lot with a step, a fence, etc. Therefore, in such cases, the host vehicle is not likely to collide with the vehicle on a collision path.

The driving assistance device according to the above aspect does not provide a warning when the host vehicle is traveling in the parking lot (that is, when the parking lot traveling condition is satisfied). Thus, with the driving assistance device according to the above aspect, it is possible to more accurately determine whether a collision with the other vehicle with communication capabilities may occur, thereby reducing the frequency or possibility of occurrence of an unnecessary warning.

In the above aspect, the driving assistance device may include a radar configured to acquire information about an object around the host vehicle, wherein the electronic control unit may be configured to determine whether there is a route obstacle based on the information about the object, and to determine that the predetermined parking lot traveling condition is satisfied when determining that there is the route obstacle, the route obstacle being an object that interferes with traveling of the host vehicle to a route intersection point where the host vehicle predicted route and the other vehicle predicted route intersect each other.

As described above, the part of the parking lot other than the entrance/exit is separated from the road near the parking lot by a step, a fence, etc. (that is, route obstacles). Thus, in the above configuration, the driving assistance device determines whether the parking lot traveling condition is satisfied based on whether the route obstacle is detected. Therefore, with the above configuration, it is possible to accurately determine whether the host vehicle is traveling in the parking lot.

In the above aspect, the driving assistance device may include a map database configured to store map information including information for specifying a range of the parking lot, wherein the electronic control unit may be configured to determine whether the position of the host vehicle is included in the range of the parking lot based on the map information, and to determine that the predetermined parking lot traveling condition is satisfied when determining that the position of the host vehicle is included in the range of the parking lot.

In many cases, map information (specifically, information related to a road map) includes information about positions of parking lots. Thus, in the above configuration, the driving assistance device determines whether the parking lot traveling condition is satisfied by applying the current position to the map information. According to the above configuration, it is possible to accurately determine whether the host vehicle is traveling in the parking lot.

In the above aspect, the electronic control unit may be configured to determine that the predetermined parking lot traveling condition is satisfied after a predetermined specific satisfaction condition is satisfied until a predetermined specific cancellation condition is satisfied, the predetermined specific satisfaction condition being a condition that is satisfied in at least one of a case where the host vehicle is likely to be entering the parking lot and a case where the host vehicle is likely to be located in the parking lot.

The specific satisfaction condition is satisfied, when the driver of the host vehicle performs operation that is likely to be performed in the parking lot or when a process of a driving assistance function useful when the driver moves the vehicle into the parking lot is performed, for example. On the other hand, the specific cancellation condition is satisfied, when the current position is relatively far from a point where the specific satisfaction condition is satisfied, or when a vehicle speed is relatively high, for example. Thus, according to the above configuration, it is possible to accurately determine whether the host vehicle is traveling in the parking lot.

In the above aspect, the electronic control unit may be configured to provide at least one of a parking assistance function and an obstacle detecting function, the parking assistance function being a function of executing a parking assistance process to assist the host vehicle in moving to a parking space, the obstacle detecting function being a function of executing a nearby obstacle warning process to notify the driver of the presence of the nearby obstacle when the nearby obstacle with which the host vehicle is likely to collide is detected at least while the host vehicle is moving toward the parking space, wherein the electronic control unit may be configured to determine that the predetermined specific satisfaction condition is satisfied when at least one of a condition that is satisfied when the electronic control unit executes the parking assistance process and a condition that is satisfied when the electronic control unit executes the nearby obstacle warning process is satisfied.

The parking assistance process is started, for example, when the driver stops the host vehicle near the parking space and further performs a predetermined operation. When the parking assistance process is executed, the host vehicle is likely to be in the parking lot. In addition, when a nearby obstacle is detected, the host vehicle is likely to be in the parking lot. Thus, in the above configuration, the driving assistance device determines that the specific satisfaction condition is satisfied when the parking assistance process is executed and/or when a nearby obstacle is detected. Thus, according to the above configuration, it is possible to accurately determine whether the host vehicle is traveling in the parking lot.

In the driving assistance device according to the above aspect, the electronic control unit may be configured to determine that the specific satisfaction condition is satisfied when the host vehicle moves backward.

Even when the vehicle is parked forward in the parking space, there is a case where the host vehicle is temporarily moved backward. Therefore, in the above configuration, the driving assistance device determines that the specific satisfaction condition is satisfied when the host vehicle moves backward. Thus, according to the above configuration, it is possible to accurately determine whether the host vehicle is traveling in the parking lot.

Constitutional elements of the disclosure are not limited to those defined by designation and/or symbols in the embodiment. Other features and associated advantages of the disclosure will be readily understood from the description of the embodiment with reference to drawings below.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
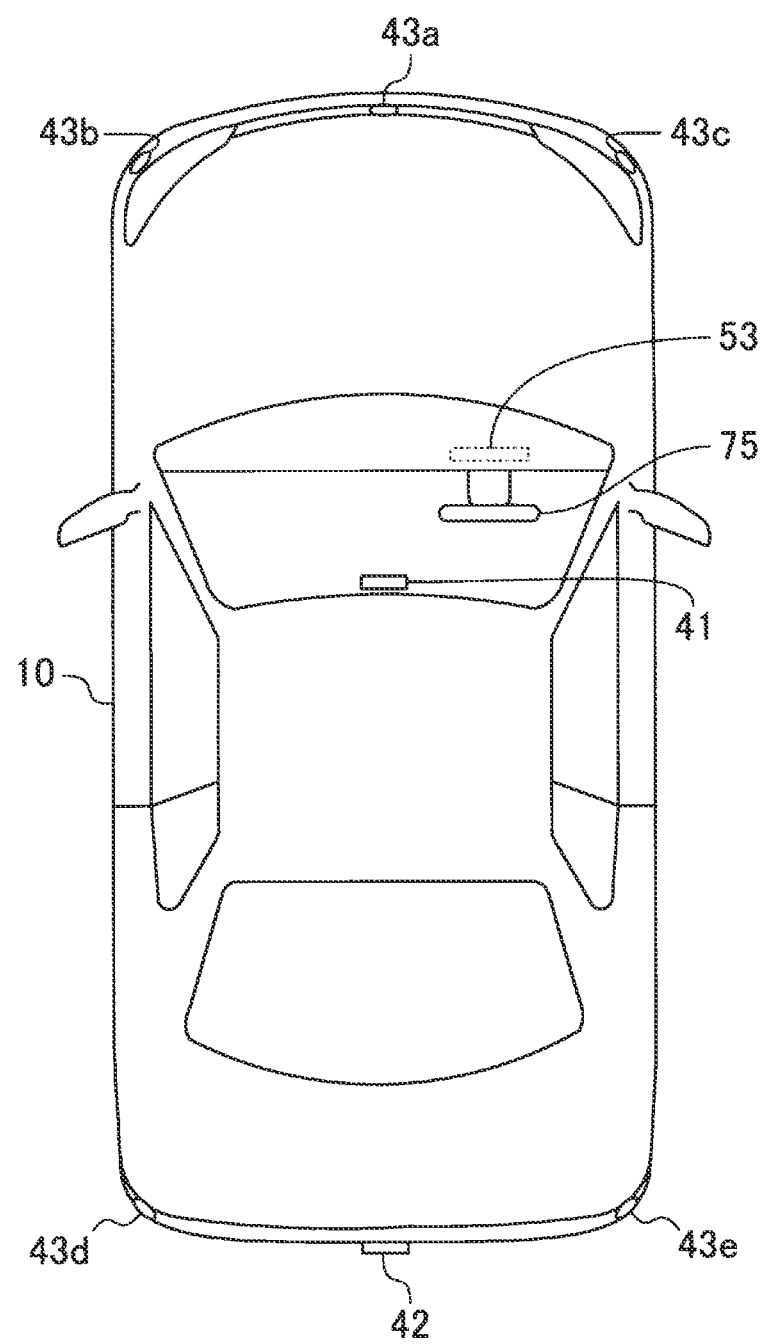
FIG. 1 is a schematic view of a vehicle on which a driving assistance device according to an embodiment (assistance device) is mounted.

Hereinafter, a driving assistance device according to an embodiment (hereinafter, also referred to as "assistance device") will be described with reference to the drawings. The assistance device is applied to a vehicle 10 shown in FIG. 1. As shown in FIG. 2, the assistance device includes a driving assistance ECU 20, an engine ECU 31, a brake ECU 32, and an electric power steering (EPS)-ECU 33 that are electronic control units (ECUs).

The driving assistance ECU 20 includes, as a main element, a microcomputer including a central processing unit (CPU), a nonvolatile memory, and a random access memory (RAM). The CPU reads data, performs numerical calculations, and outputs calculation results etc. by sequentially executing a predetermined program (routine). The nonvolatile memory includes a flash memory, and stores the program executed by the CPU, a lookup table (map) referred to when the program is executed, setting states of driving assistance functions described later, and the like. The RAM temporarily stores data referred to by the CPU.

Each of the engine ECU 31, the brake ECU 32, and the EPS-ECU 33 includes a microcomputer as a main element, like the driving assistance ECU 20. These ECUs can communicate (can exchange data) with each other via a controller area network (CAN) 34. In addition, each of the ECUs can receive output values of sensors connected to the other ECUs from the other ECUs via the CAN 34.

The driving assistance ECU 20 includes a front camera 41, a rear camera 42, a millimeter wave radar 43, a vehicle speed sensor 44, an acceleration sensor 45, a shift position sensor 46, a GPS receiver 47, a map database 48, a travel information transmitter 51, and a travel information receiver 52, a display 53, and a speaker 54.

The front camera 41 (see FIG. 1) acquires an image obtained by taking an image of an area forward of the vehicle 10 (hereinafter also referred to as "front image"), and outputs a signal representing the front image to the driving assistance ECU 20 every time a predetermined time elapses. The rear camera 42 acquires an image obtained by taking an image of an area rearward of the vehicle 10 (hereinafter also referred to as "rear image"), and outputs a signal representing the rear image to the driving assistance ECU 20 every time a predetermined time elapses.

The driving assistance ECU 20 extracts (recognizes) objects included in each of the front image and the rear image by a known method. In addition, the driving assistance ECU 20 acquires (estimates) distances between the vehicle 10 and each of the objects based on lengths between respective lower ends of the extracted objects in an image (that is, one of the front image and the rear image) and a lower end of the image (for example, a length Py1 and a length Py2 in FIG. 4 to be described later). The driving assistance ECU 20 estimates that the longer the length between the lower end of the object in the image and the lower end of the image, the longer the distance between the vehicle 10 and the object.

Figure 2:
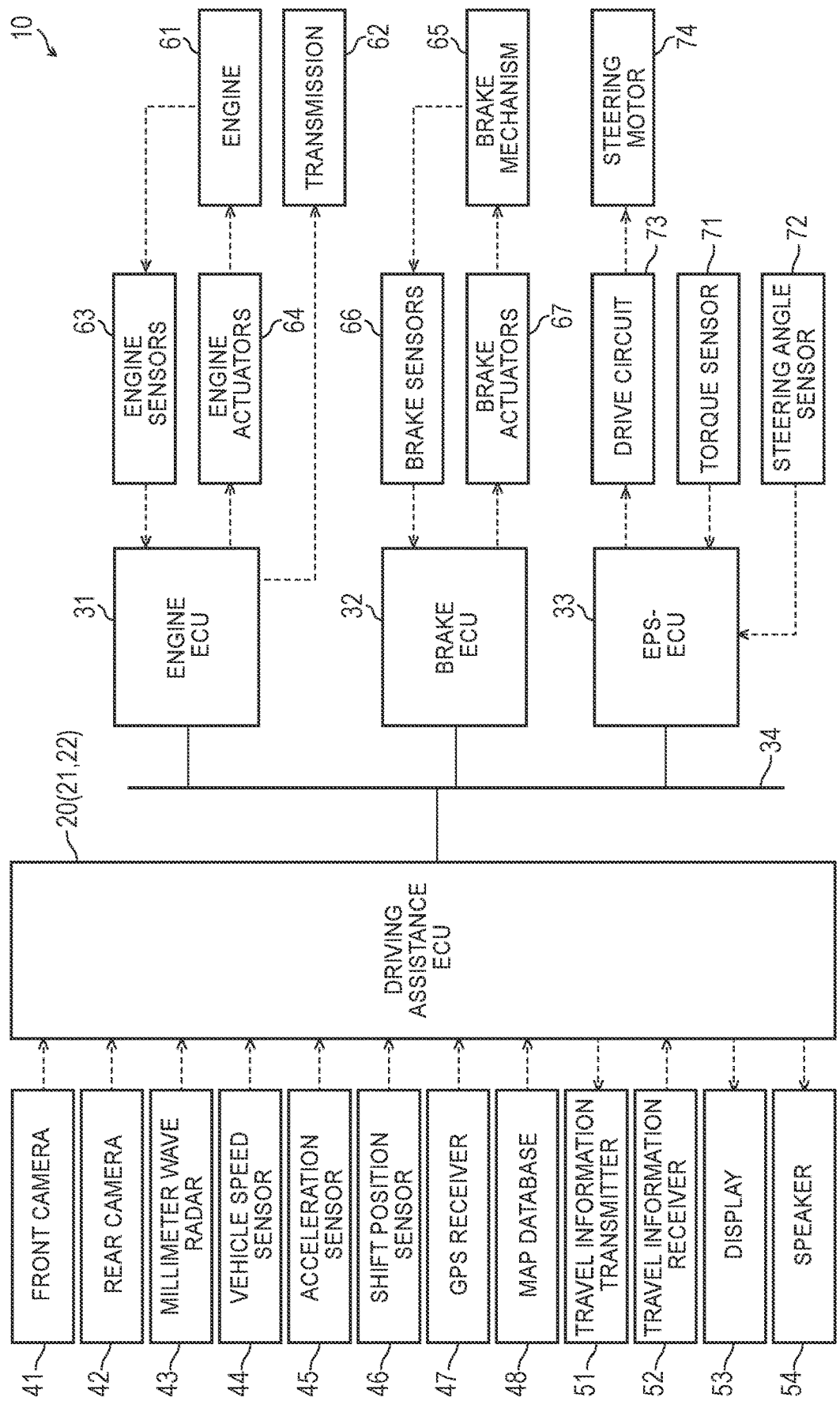
FIG. 2 is a block diagram of the vehicle.

The millimeter wave radar 43 includes a front center radar 43a, a front left radar 43b, a front right radar 43c, a rear left radar 43d, and a rear right radar 43e, each of which is a radar device (see FIG. 1).

The front center radar 43a detects an object in the area forward of the vehicle 10. The front left radar 43b detects an object in a front left area with respect to the vehicle 10. The front right radar 43c detects an object in a front right area with respect to the vehicle 10. The rear left radar 43d detects an object in a rear left area with respect to the vehicle 10. The rear right radar 43e detects an object in a rear right area with respect to the vehicle 10.

Each of the radar devices included in the millimeter-wave radar 43 transmits (emits) a radio wave of a millimeter wave band (millimeter wave) and receives a reflected wave of the transmitted millimeter wave, thereby acquiring, as "object information", information indicating a direction of the object, a distance and a relative speed between the object and the vehicle 10, and the like, to output the object information to the driving assistance ECU 20 every time a predetermined time elapses.

The vehicle speed sensor 44 detects a vehicle speed Vt that is a magnitude of a traveling speed of the vehicle 10 and outputs a signal representing the vehicle speed Vt to the driving assistance ECU 20. The acceleration sensor 45 detects an acceleration As in a front-rear direction of the vehicle 10 and outputs a signal representing the acceleration As to the driving assistance ECU 20.

The shift position sensor 46 detects a shift position Sp that is a travel mode of the vehicle 10 which is selected through operation of a shift lever (not shown) by a driver of the vehicle 10, and outputs a signal representing the shift position Sp to the driving assistance ECU 20. The shift position Sp includes: a "P" range for parking; a "D" range, an "S" range, and a "B" range for forward traveling; an "R" range for reverse traveling; and an "N" range for interrupting torque transmission from an engine 61 serving as a power source of the vehicle 10 to driving wheels of the vehicle 10.

The GPS receiver 47 acquires a current position Pn of the vehicle 10 based on positioning signals received from positioning satellites (GPS satellites in the embodiment). The current position Pn is represented by a "combination of a latitude and a longitude". The GPS receiver 47 outputs a signal representing the current position Pn of the vehicle 10 to the driving assistance ECU 20. The driving assistance ECU 20 acquires a traveling direction Dr of the vehicle 10 based on a change in the current position Pn with time.

The map database 48 is comprised of a hard disk drive (HDD) and stores map information. The map database 48 includes information about "nodes", "links", "parking lots", and "facilities" (map information, that is, information for specifying a position). The nodes are intersections, dead ends, and the like. The links are roads connecting nodes. The parking lots represent "places (areas) where vehicles (including the vehicle 10) can be parked" and that are adjacent to the links, and include outdoor parking lots and indoor parking lots. The facilities are facilities that are adjacent to the links and different from the parking lots (for example, buildings and parks).

The travel information transmitter 51 transmits "travel information" of the vehicle 10 to another vehicle traveling around the vehicle 10 at predetermined time intervals using dedicated short-range wireless communication (DSRC in the embodiment). The travel information includes "a vehicle ID, the current position Pn, the vehicle speed Vt, the traveling direction Dr, etc." of the vehicle 10.

The travel information receiver 52 receives "travel information transmitted by other vehicles traveling around the vehicle 10 using the dedicated short-range wireless communication". That is, the vehicle 10 implements vehicle-to-vehicle communication using the travel information transmitter 51 and the travel information receiver 52. The other vehicle that transmits travel information is also referred to as "other vehicle with communication capabilities", for convenience. The vehicle 10 and the other vehicle with communication capabilities are individually assigned with a unique vehicle ID (that is, a vehicle ID not overlapping with those of vehicles other than the vehicle 10 and the other vehicle with communication capabilities) in advance. The driving assistance ECU 20 stores the travel information received from the other vehicle with communication capabilities in the RAM until a predetermined time elapses since the travel information is received.

The display 53 is a liquid crystal display (LCD) disposed at such a position in a vehicle cabin of the vehicle 10 that the driver can visually recognize the display 53 (specifically, in front of the driver) (see FIG. 1). Characters, graphics, and the like displayed on the display 53 are controlled by the driving assistance ECU 20.

The speaker 54 is disposed in the vehicle cabin of the vehicle 10. A warning sound, a voice message, and the like reproduced by the speaker 54 are controlled by the driving assistance ECU 20.

The engine ECU 31 controls the engine 61 and the transmission 62, thereby controlling a driving force of the vehicle 10 (see FIG. 2). The engine ECU 31 is connected to various engine sensors 63 and receives output values of the engine sensors 63. The engine sensors 63 are sensors that detect operation state amounts (parameters) of the engine 61. The engine sensors 63 include an accelerator pedal operation amount (depression amount) sensor, a throttle valve opening sensor, an engine rotation speed sensor, an intake air amount sensor, and the like. The engine ECU 31 determines a required drive torque Dreq (a required value of a drive torque Dd described later) based on the vehicle speed Vt, the output values of the engine sensors 63, and the like.

In addition, the engine ECU 31 is connected to engine actuators 64 including a throttle valve actuator, a fuel injection valve actuator, and the like, and controls the actuators so as to control a torque generated by the engine

61. The engine ECU 31 controls the engine actuators 64 and the transmission 62 so that the drive torque Dd transmitted to the driving wheels of the vehicle 10 matches the required drive torque Dreq. As a result, the acceleration As is adjusted.

Further, when the engine ECU 31 receives a "driving force control request" including a target drive torque Ddtg from the driving assistance ECU 20, the engine ECU 31 controls the engine actuators 64 and the transmission 62 so that the actual drive torque Dd matches the target drive torque Ddtg.

The brake ECU 32 controls a brake mechanism 65 that is a hydraulic friction braking device mounted on the vehicle 10. The brake ECU 32 is connected to various brake sensors 66 and receives output values of the brake sensors 66. The brake sensors 66 are sensors that detect state amounts used to control the brake mechanism 65, and includes a brake pedal operation amount sensor, a sensor for brake fluid pressure that acts on the brake mechanism 65, and the like. The brake ECU 32 determines a required braking force Breq (a required value of a braking force Bf described later) based on the vehicle speed Vt, the output values of the brake sensors 66, and the like.

In addition, the brake ECU 32 is connected to various brake actuators 67 that are hydraulic control actuators for the brake mechanism 65. The brake ECU 32 controls the brake actuators 67 so that the braking force Bf, which is a friction braking force generated by each of the wheels, matches the required braking force Breq. As a result, the acceleration As (in this case, the degree of decrease in the vehicle speed Vt, namely, a deceleration) is adjusted.

Further, when the brake ECU 32 receives a "braking force control request" including a target braking force Bftg from the driving assistance ECU 20, the brake ECU 32 controls the brake actuators 67 so that the actual braking force Bf matches the target braking force Bftg.

The EPS-ECU 33 is connected to a torque sensor 71 and a steering angle sensor 72, and receives detection signals from the sensors 71, 72. The torque sensor 71 detects a steering torque Ts applied by the driver to a steering wheel 75 (see FIG. 1), and outputs a signal representing the steering torque Ts. The steering angle sensor 72 detects a steering angle θs, which is a rotation angle of the steering wheel 75, and outputs a signal representing the steering angle θs.

The EPS-ECU 33 determines a target assist torque Tatg, which is a target value of a torque (assist torque) that assists the driver in operation of the steering wheel 75, based on the vehicle speed Vt, the steering torque Ts, the steering angle θs, and the like.

The EPS-ECU 33 is connected to a drive circuit 73. The drive circuit 73 supplies electric power to a steering motor 74. The steering motor 74 generates a torque Tm that rotates a steering shaft. The EPS-ECU 33 controls the drive circuit 73 so that the torque Tm matches a target assist torque Tatg.

Further, when the EPS-ECU 33 receives a "steering angle control request" including a target steering angle θstg from the driving assistance ECU 20, the EPS-ECU 33 controls the steering motor 74 so that the actual steering angle θs matches the target steering angle θstg.

Outline of Driving Assistance Function

The driving assistance ECU 20 provides a driving assistance function including functions 1 to 5 described below in order to assist the driver in driving the vehicle 10. Notifications and warnings provided to the driver when the driving assistance functions are performed are provided via the display 53 and the speaker 54.

In addition, each of the driving assistance functions of the functions 2 to 5 is executed when a request state set by the driver is an ON state and an execution condition corresponding to the driving assistance function described below is satisfied. The request state of the driving assistance function is a setting item related the driving assistance function, and is set to either the ON state or an OFF state by the driver. When the request state of a driving assistance function is the OFF state, the function is not executed even if the execution condition for the driving assistance function is satisfied. That is, when the request state is the OFF state, execution of the driving assistance function is prohibited. On the other hand, when the request state of one of the driving assistance functions is the ON state, the function is executed even if the execution condition for that driving assistance function is satisfied. That is, when the request state is the ON state, execution of the driving assistance function is permitted. The driver can switch the request state of each of the driving assistance functions 2 to 5 between the ON state and the OFF state by performing a predetermined operation.

Function 1: Intelligent Parking Assist (IPA)

Figure 3:
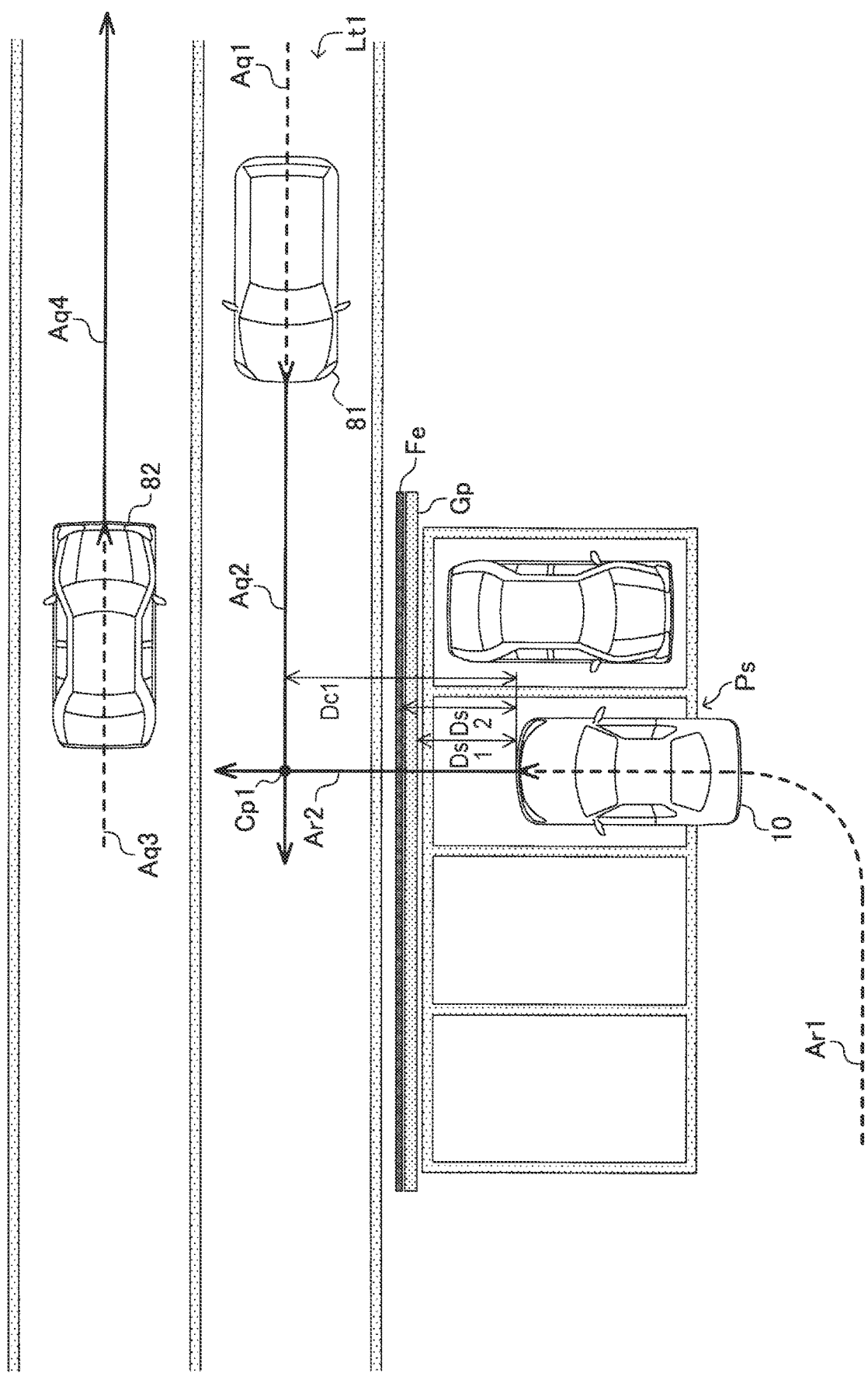
FIG. 3 is a drawing that shows an example of a situation where a warning is not issued by the assistance device.
Figure 4:
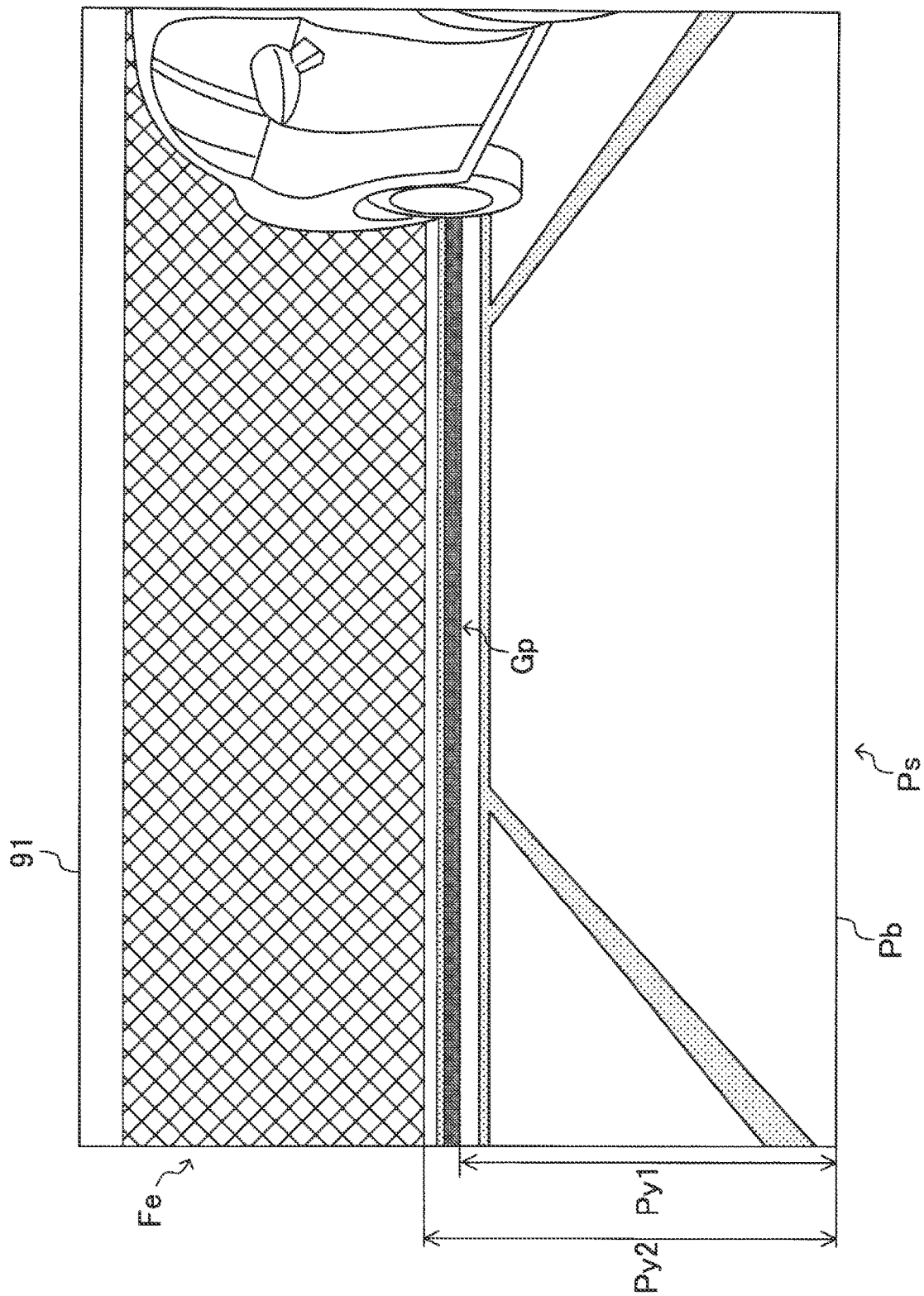
FIG. 4 shows an image of an area forward of the vehicle in the situation shown in FIG. 3.

The Intelligent Parking Assist function is a function of autonomously parking the vehicle 10 in a parking space that appears in either the front image or the rear image (a target parking frame, e.g., a parking space Ps shown in FIGS. 3 and 4). That is, when the Intelligent Parking Assist function is executed, the vehicle speed Vt and the steering angle θs are controlled, so that the vehicle 10 is moved from the predetermined position to the target parking frame and then set in a parked state. The Intelligent Parking Assist function is started by operating an operation switch (not shown) provided on a dashboard of the vehicle 10. When the driving assistance ECU 20 detects (recognizes) a plurality of parking spaces around the vehicle 10 at the beginning of the Intelligent Parking Assist function, the driving assistance ECU 20 provides, via the display 53, a notification for prompting the driver "to select a target parking frame through the predetermined operation".

Function 2: Clearance Sonar

A clearance sonar function is a function of notifying, when there is an obstacle (particularly, a stationary object such as a wall) around the vehicle 10, the driver of the presence of the obstacle. The execution condition of the clearance sonar function is satisfied when the shift position Sp is other than the "P" range and the vehicle speed Vt is equal to or lower than a predetermined detection speed threshold Vth1.

Function 3: Front Cross Traffic Alert (FCTA)

The Front Cross Traffic Alert function is a function of notifying, when there is an obstacle (especially, another vehicle) approaching from the front during the forward traveling of the vehicle 10, the driver of the presence of the obstacle. The execution condition of the Front Cross Traffic Alert function is satisfied when the request state is the ON state, the shift position Sp is any of the "D" range, the "S" range, and the "B" range, and the vehicle speed Vt is equal to or lower than the detected speed threshold Vth1.

Function 4: Rear Cross Traffic Alert (RCTA)

The Rear Cross Traffic Alert function is a function of notifying, when there is an obstacle (especially, another vehicle) approaching from the rear during the reverse traveling of the vehicle 10, the driver of the presence of the obstacle. The execution condition of the Rear Cross Traffic Alert function is satisfied when the shift position Sp is the "R" range and the vehicle speed Vt is equal to or lower than the detection speed threshold Vth1.

Function 5: Vehicle-to-Vehicle Collision Warning Function

The vehicle-to-vehicle collision warning function is a function of providing a warning (hereinafter, also referred to as "vehicle-to-vehicle warning") to the driver so as to alert the driver to a vehicle on a collision path when it is determined that there is the other vehicle with communication capabilities, which is likely to collide with the vehicle 10 (i.e., vehicle on a collision path) based on "travel information of the other vehicle", which is received by the travel information receiver 52. Details of the vehicle-to-vehicle collision warning function including an execution condition thereof will be described later.

In order to realize the driving assistance functions (that is, functions 1 to 5), the driving assistance ECU 20 uses the front image received from the front camera 41, the rear image received from the rear camera 42, and the object information received from the millimeter wave radar 43. In addition, in order to realize the driving assistance functions, the driving assistance ECU 20 controls the engine ECU 31, the brake ECU 32, and the EPS-ECU 33 as necessary. That is, the driving assistance ECU 20 transmits each of the driving force control request, the braking force control request, and the steering angle control request to the corresponding ECU as necessary.

For example, during the execution of the Intelligent Parking Assist function, the driving assistance ECU 20 acquires (determines) the target vehicle speed Vtgt every time a predetermined time elapses. In addition, the driving assistance ECU 20 calculates the target acceleration Astg so that the actual vehicle speed Vt matches the target vehicle speed Vtgt. Further, the driving assistance ECU 20 controls the engine ECU 31 and the brake ECU 32 so that the actual acceleration As matches the target acceleration Astg.

During the execution of the Intelligent Parking Assist function, the driving assistance ECU 20 acquires (determines) a parking path based on the distance and the relative angle between the target parking frame and the vehicle 10. Further, the driving assistance ECU 20 obtains a deviation of the vehicle 10 from the parking path, and calculates a target steering angle θstg based on the deviation so that the vehicle 10 travels along the parking path. The driving assistance ECU 20 controls the EPS-ECU 33 so that the actual steering angle θs matches the target steering angle θstg.

The Intelligent Parking Assist function is also referred to as "parking assistance function" for convenience. A process executed when the driving assistance ECU 20 provides the Intelligent Parking Assist function is also referred to as "parking assistance process" for convenience. Processes executed when the driving assistance ECU 20 provides the driving assistance functions of the functions 2 to 4 described above are referred to as "nearby obstacle warning processes". The obstacle detected by the above-described driving assistance functions of the functions 2 to 4 is also referred to as "nearby obstacle" for convenience.

Vehicle-to-Vehicle Collision Warning Process

Next, the vehicle-to-vehicle collision warning process will be described in the order of a method of extracting a vehicle on a collision path and execution conditions.

In order to extract the vehicle on a collision path from the other vehicles with communication capabilities, the driving assistance ECU 20 estimates (acquires) a "host vehicle predicted route" by a known method based on the vehicle speed Vt, the acceleration As, and the traveling direction Dr of the vehicle 10. The host vehicle predicted route is a route on which the vehicle 10 is predicted to travel in a period starting from the current time and ending at a time when a predetermined prediction time Tp has elapsed from the current time (hereinafter referred to as "prediction period"), that is, a predicted travel route of the host vehicle.

The driving assistance ECU 20 estimates (acquires) an "other vehicle predicted route" by a known method based on the travel information of the other vehicle with communication capabilities, which is received from the other vehicle with communication capabilities (that is, "the vehicle ID, the current position Pn, the vehicle speed Vt, the traveling direction Dr, etc." of the other vehicle with communication capabilities). The other vehicle predicted route is a route on which the other vehicle with communication capabilities is predicted to travel during the above-described prediction period (that is, the predicted travel route of the other vehicle with communication capabilities). When there is a plurality of other vehicles with communication capabilities around the vehicle 10, the driving assistance ECU 20 estimates (acquires) the other vehicle predicted routes for the respective vehicle IDs of the other vehicles with communication capabilities, which are included in the travel information.

When the host vehicle predicted route and the other vehicle predicted route intersect each other, the driving assistance ECU 20 extracts (specifies) the other vehicle with communication capabilities corresponding to the other vehicle predicted route as the "vehicle on a collision path". A point where the host vehicle predicted route and the other vehicle predicted route intersect is also referred to as a "route intersection point, for convenience.

An example of the vehicle on a collision path is shown in FIG. 3. In FIG. 3, a vehicle 81 and a vehicle 82 are the other vehicles with communication capabilities. A broken-line arrow Ar 1 represents a travel locus of the vehicle 10 (a movement locus of the center of the front end of the vehicle 10 in the lateral direction). An arrow Ar2 represents the host vehicle predicted route of the vehicle 10.

A broken-line arrow Aq1 represents a travel locus of the vehicle 81. An arrow Aq2 represents the other vehicle predicted route of the vehicle 81. The host vehicle predicted route of the vehicle 10 (that is, the arrow Ar2) and the other vehicle predicted route of the vehicle 81 (that is, the arrow Aq2) intersect at a substantially right angle at a point Cp1. Therefore, the vehicle 81 is the vehicle on a collision path, and the point Cp1 is the route intersection point.

A broken-line arrow Aq3 represents a travel locus of the vehicle 82. An arrow Aq4 represents the other vehicle predicted route of the vehicle 82. As understood from FIG. 3, the host vehicle predicted route of the vehicle 10 and the other vehicle predicted route of the vehicle 82 do not intersect each other. Therefore, the vehicle 82 is not the vehicle on a collision path.

The execution condition (execution permission condition) of the vehicle-to-vehicle collision warning process is satisfied when the shift position Sp is any of the ranges other than the "P" range, the brake pedal is not operated, and the traveling state of the vehicle 10 is not a "parking lot traveling state". When the execution condition is not satisfied, the vehicle-to-vehicle warning is not performed (prohibited). The driving assistance ECU 20 executes a "traveling state determination process" to determine whether the traveling state of the vehicle 10 is the parking lot traveling state.

In the traveling state determination process, the driving assistance ECU 20 determines that the traveling state of the vehicle 10 is the parking lot traveling state when there is a "route obstacle" between the current position Pn of the vehicle 10 and the route intersection point. The route obstacle is an obstacle that interferes with traveling of the vehicle 10 to the route intersection point (for example, a step or a fence). The driving assistance ECU 20 determines whether there is the route obstacle based on the front image and the object information.

FIG. 4 shows an image 91 that is a front image when the vehicle 10 is at a position shown in FIG. 3. As understood from FIG. 3, the vehicle 10 is traveling in a parking lot and is about to enter a parking space Ps by traveling forward. The image 91 includes a step Gp and a fence Fe that are route obstacles.

As described above, the driving assistance ECU 20 estimates the distance between the vehicle 10 and the object based on the length between the lower end of the object included in the front image (in this example, the image 91) and the lower end Pb of the image 91. Specifically, the driving assistance ECU 20 estimates a distance Ds1 between the vehicle 10 and the step Gp based on the length Py1 between the lower end of the step Gp in the image 91 and the lower end Pb of the image 91. Similarly, the driving assistance ECU 20 estimates a distance Ds2 between the vehicle 10 and the fence Fe based on the length Py2 between the lower end of the fence Fe in the image 91 and the lower end Pb of the image 91.

As understood from FIG. 3, both the distance Ds1 and the distance Ds2 are shorter than "the distance Dc1 between the vehicle 10 and the point Cp1" (that is, Ds1<Dc1 and Ds2<Dc1 are satisfied). Therefore, the driving assistance ECU 20 determines that the step Gp and the fence Fe are both route obstacles, and thus the traveling state of the vehicle 10 is the parking lot traveling state. Thus, in this case, the vehicle on a collision path is extracted, but the execution condition of the vehicle-to-vehicle collision warning process is not satisfied. Therefore, the driving assistance ECU 20 does not perform the vehicle-to-vehicle warning.

Figure 5:
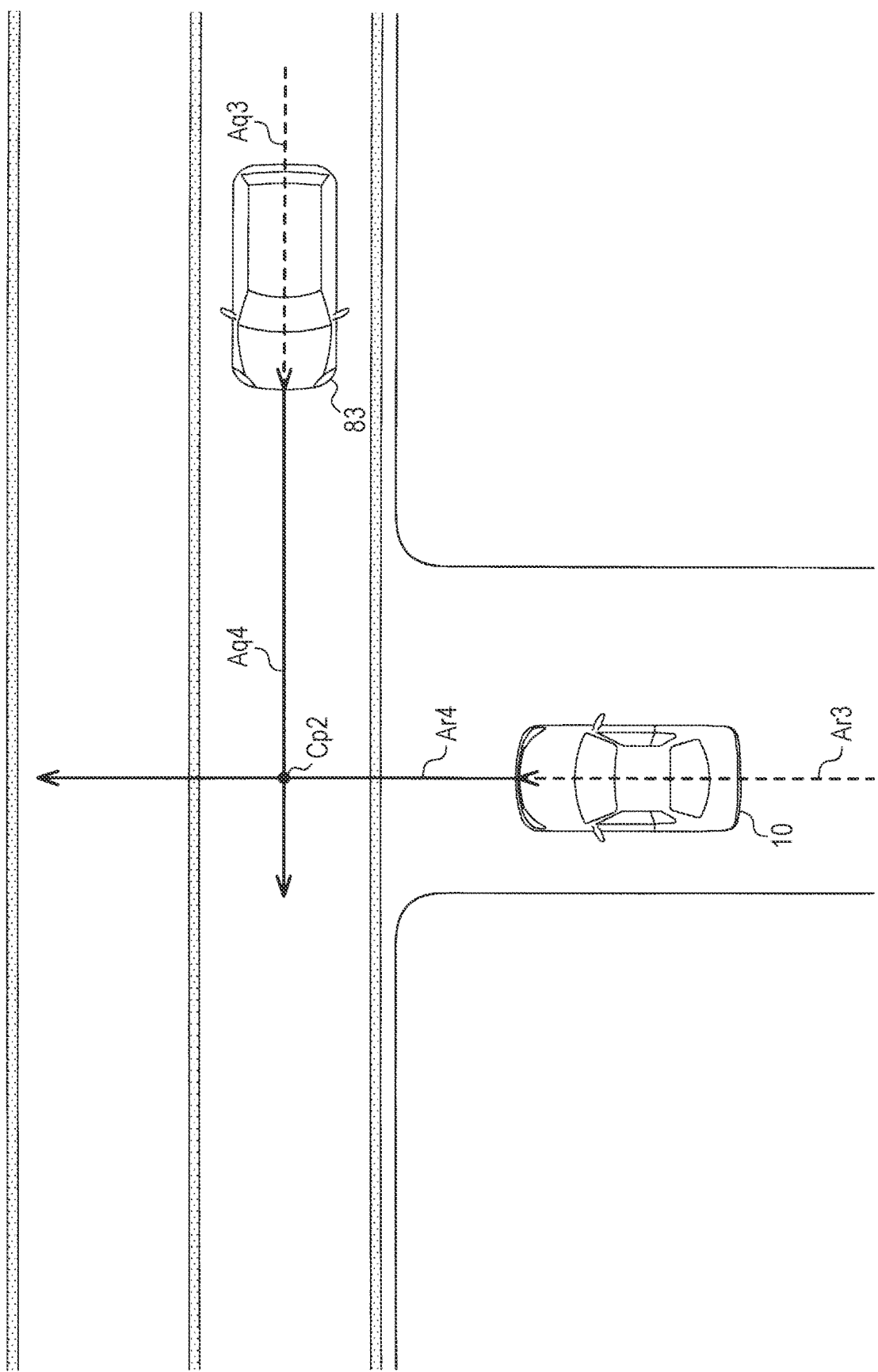
FIG. 5 is a drawing that shows an example of a situation where a warning is issued by the assistance device.

An example in which the vehicle-to-vehicle warning is performed is shown in FIG. 5. In FIG. 5, a vehicle 83 is the other vehicle with communication capabilities. A broken-line arrow Ar3 represents the travel locus of the vehicle 10. An arrow Ar4 represents the host vehicle predicted route of the vehicle 10.

A broken-line arrow Aq3 represents a travel locus of the vehicle 83. An arrow Aq4 represents the other vehicle predicted route of the vehicle 83. The host vehicle predicted route of the vehicle 10 (that is, the arrow Ar4) and the other vehicle predicted route of the vehicle 83 (that is, the arrow Aq4) intersect at a point Cp2. Therefore, the vehicle 83 is the vehicle on a collision path, and the point Cp2 is the route intersection point.

In this example, the request state of the vehicle-to-vehicle collision warning function is the ON state. The shift position Sp is the "D" range and the brake pedal is not operated. Further, there is no route obstacle between the current position Pn and the point Cp2 (that is, the route intersection point). Therefore, the driving assistance ECU 20 determines that the traveling state of the vehicle 10 is not the parking lot traveling state. That is, the execution condition of the vehicle-to-vehicle collision warning function is satisfied. Thus, in this case, the driving assistance ECU 20 performs the vehicle-to-vehicle warning.

Specific Operation of Vehicle-to-Vehicle Warning Process

Next, a specific operation of the driving assistance ECU 20 related to the vehicle-to-vehicle collision warning function will be described with reference to FIG. 6. The CPU of the driving assistance ECU 20 (hereinafter also simply referred to as "CPU") executes a "vehicle-to-vehicle collision warning process routine" shown by the flowchart in FIG. 6 every time a predetermined time elapses.

Figure 6:
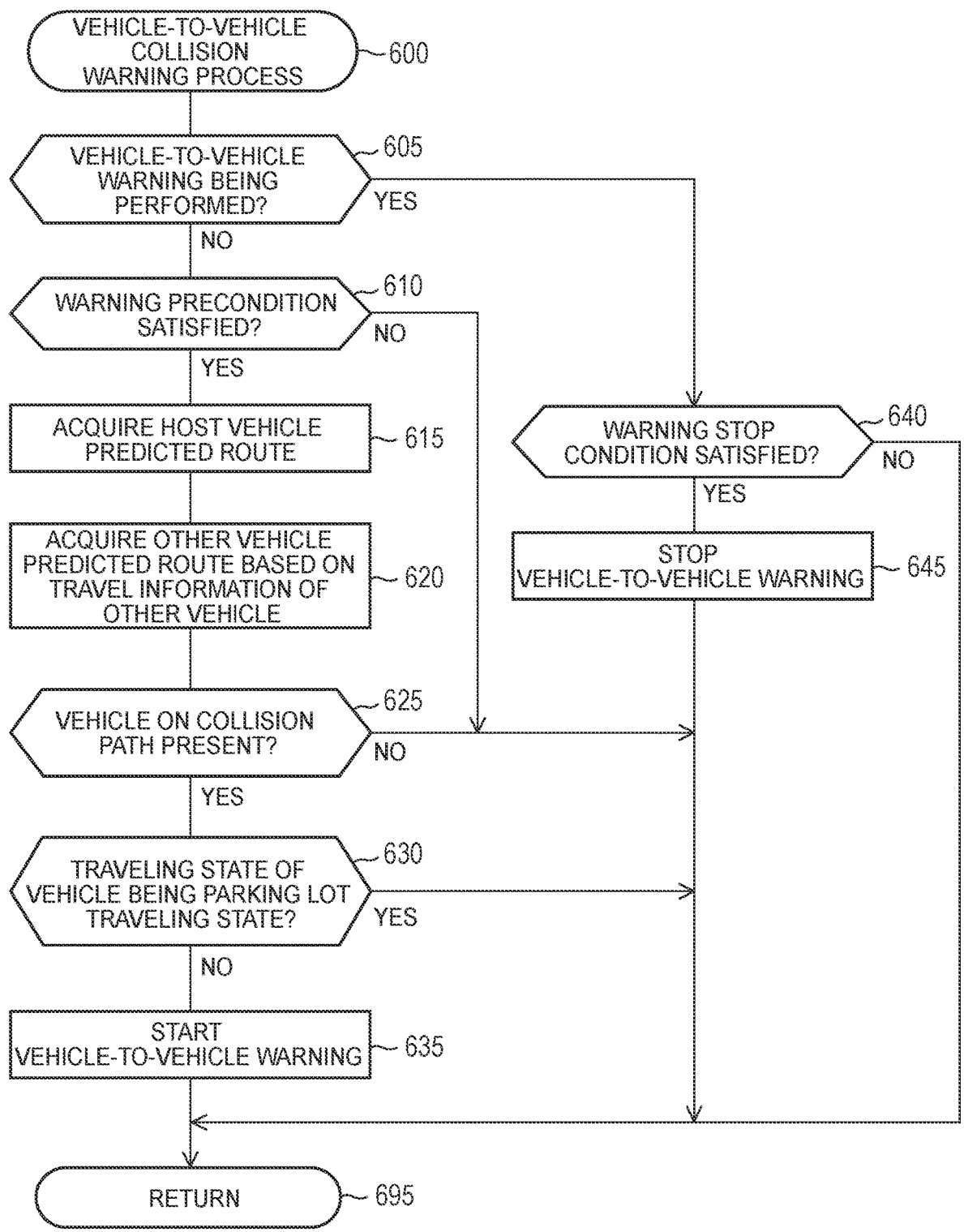
FIG. 6 is a flowchart showing a vehicle-to-vehicle collision warning process routine executed by the assistance device.

Thus, when an appropriate timing is reached, the CPU starts the process from step 600 in FIG. 6 and proceeds to step 605 to determine whether the vehicle-to-vehicle warning is being performed (that is, whether alerting the driver using the display 53 and the speaker 54 has been started).

When the vehicle-to-vehicle warning is not performed, the CPU determines as "No" in step 605, and proceeds to step 610 to determine whether a warning precondition is satisfied. More specifically, when the request state of the vehicle-to-vehicle collision warning function is the ON state, the shift position Sp is any of the ranges other than the "P" range, and the brake pedal is not operated, the CPU determines that the warning precondition is satisfied.

When the warning precondition is satisfied, the CPU determines as "Yes" in step 610, and proceeds to step 615 to estimate (acquire) the host vehicle predicted route. Next, the CPU proceeds to step 620 to estimate (acquire) the other vehicle predicted route based on the travel information received by the travel information receiver 52 from the other vehicle with communication capabilities. At this time, when there is a plurality of other vehicles with communication capabilities, the CPU estimates the other vehicle predicted routes for the respective vehicle IDs of the other vehicles with communication capabilities. Further, the CPU proceeds to step 625 to determine whether there is the vehicle on a collision path based on the host vehicle predicted route and the other vehicle predicted route. That is, the CPU determines whether there is the other vehicle predicted route that intersects the host vehicle predicted route. When there is such other vehicle predicted route, the CPU specifies the other vehicle corresponding to the other vehicle predicted route as the vehicle on a collision path.

When there is the vehicle on a collision path, the CPU determines as "Yes" in step 625, and proceeds to step 630 to determine whether the traveling state of the vehicle 10 is the parking lot traveling state. That is, the CPU obtains the route intersection point and determines whether the route obstacle has been detected between the current position Pn of the vehicle 10 and the route intersection point.

When the traveling state of the vehicle 10 is not the parking lot traveling state (that is, when the route obstacle has not been detected), the CPU determines as "No" in step 630, and proceeds to step 635 to start the vehicle-to-vehicle warning. Next, the CPU proceeds to step 695 to end the routine.

Thereafter, when the routine is started again, the CPU determines as "Yes" in step 605 because the vehicle-to-vehicle warning has been started, and proceeds to step 640 to determine whether a warning stop condition is satisfied. In the embodiment, the warning stop condition is satisfied when a predetermined time elapses since the vehicle-to-vehicle warning is started in step 635.

When the warning stop condition is not satisfied, the CPU determines as "No" in step 640, and directly proceeds to step 695. When the warning stop condition is satisfied, the CPU determines as "Yes" in step 640, and proceeds to step 645 to stop the vehicle-to-vehicle warning (that is, alerting using the display 53 and the speaker 54). Next, the CPU proceeds to step 695.

When the determination condition of step 610 is not satisfied (that is, when the warning precondition is not satisfied), the CPU determines as "No" in step 610 and proceeds directly to step 695. When the determination condition of step 625 is not satisfied (that is, when there is no vehicle on a collision path), the CPU determines as "No" in step 625, and directly proceeds to step 695. When the determination condition of step 630 is not satisfied (that is, when the route obstacle has been detected, and therefore it is determined that the traveling state of the vehicle 10 is the parking lot traveling state), the CPU determines as "Yes" in step 630, and proceeds directly to step 695.

First Modification of Embodiment

Next, a first modification of the assistance device (hereinafter also referred to as "assistance device according to the first modification") will be described. In the traveling state determination process, the driving assistance ECU 20 of the assistance device according to the embodiment determines that the traveling state of the vehicle 10 is the parking lot traveling state when there is the route obstacle between the vehicle 10 and the vehicle on a collision path. The assistance device according to the first modification is different from the assistance device according to the embodiment only in that whether the traveling state of the vehicle 10 is the parking lot traveling state is determined based on the current position Pn of the vehicle 10 and the information about a position of the parking lot stored in the map database 48.

Specifically, the driving assistance ECU 21 of the assistance device according to the first modification determines that the traveling state of the vehicle 10 is the parking lot traveling state when the current position Pn of the vehicle 10 is included in a range of the "parking lot" in the map database 48. When the current position Pn of the vehicle 10 is in a position outside the range of the "parking lot" in the map database 48, the driving assistance ECU 21 determines that the traveling state of the vehicle 10 is not the parking lot traveling state.

Second Modification of Embodiment

Next, a second modification of the assistance device (hereinafter also referred to as "assistance device according to a second modification") will be described. The assistance device according to the second modification is different from the assistance device according to the embodiment only in that the assistance device according to the second modification determines that the traveling state of the vehicle 10 is the parking lot traveling state after a "specific satisfaction condition" described later is satisfied until a "specific cancellation condition" described later is satisfied.

The specific satisfaction condition is satisfied when at least one of the following conditions (1a) to (1d) is satisfied.
Condition (1a): The driver has turned on the Intelligent Parking Assistance function.
Condition (1b): An obstacle (that is, a nearby obstacle) has been detected by any of the driving assistance functions of the functions 2 to 4 described above.
Condition (1c): The vehicle 10 has traveled with the shift position Sp being the "R" range.
Condition (1d): The vehicle 10 has entered a place where a "parking lot sign" is posted (hereinafter also referred to as "parking lot entrance") or passed through the parking lot entrance.

The specific cancellation condition is satisfied when at least one of the following conditions (2a) and (2b) is satisfied.
Condition (2a): The distance from the current position Pn at the time when the specific satisfaction condition was satisfied to the current position Pn at the present time has become larger than a predetermined cancellation distance threshold Dth.
Condition (2b): The vehicle speed Vt has become higher than a predetermined cancellation speed threshold Vth2.

Figure 7A:
FIG. 7A shows an example of a parking sign template stored in the assistance device.
Figure 7B:
FIG. 7B shows an example of a parking sign template stored in the assistance device.

The condition (1d) will be specifically described. In many cases, the parking lot sign is posted at an entrance of the parking lot. Various parking lot signs are stored, as templates for pattern matching, in the driving assistance ECU 22 of the assistance device according to the second modification. Examples of the parking lot signs stored as templates are shown in FIGS. 7A and 7B. The driving assistance ECU 22 determines (searches) whether there is a region similar to one of the stored templates (similar-to-sign region) in the front image. When the driving assistance ECU 22 determines that there is the similar-to-sign region in the front image, the driving assistance ECU 22 determines that the condition (1d) is satisfied.

The cancellation distance threshold Dth in the condition (2a) is set to a value larger than an upper limit value in a "range of a general diagonal length of sites used for parking lots". The cancellation speed threshold Vth2 in the condition (2b) is set to a value that is larger than the detected speed threshold Vth1 and larger than an upper limit value in a "range of a general vehicle speed Vt when the vehicle 10 is traveling in the parking lot".

As described above, with the assistance devices according to the embodiment, the first modification, and the second modification, it is possible to accurately determine whether a collision with the other vehicle with communication capabilities occurs and to perform the vehicle-to-vehicle warning based on the determination result.

The assistance device according to the embodiment has been described above. However, the disclosure is not limited to the above embodiment, and various modifications can be made without departing from the scope of the disclosure. For example, in the embodiment, the GPS receiver 47 receives the positioning signals from the GPS satellites. However, the GPS receiver 47 may receive other satellite positioning signals instead of the GPS signals or in addition to the GPS signals. The other satellite positioning signals may be, for example, the Global Navigation Satellite System (GLONASS) signals and the Quasi-Zenith Satellite System (QZSS) signals.

In the embodiment, the driving assistance ECU 20 acquires (estimates) the other vehicle predicted route based on the travel information received from the other vehicle with communication capabilities. However, the driving assistance ECU 20 may be configured to acquire (receive) the other vehicle predicted route acquired (estimated) by the other vehicle with communication capabilities, through the travel information receiver 52.

In the embodiment, the travel information transmitter 51 and the travel information receiver 52 perform communication (that is, transmission/reception of the travel information) with the other vehicles with communication capabilities through the DSRC. However, a wireless communication protocol other than the DSRC may be used for communication with other vehicles with communication capabilities. For example, the travel information transmitter 51 and the travel information receiver 52 may perform communication with the other vehicles with communication capabilities through the fifth generation mobile communication system (5G).

In the embodiment, the parking assistance function (specifically, the Intelligent Parking Assist function) is a function of autonomously parking the vehicle 10 in the parking space. However, the parking assistance function may be a function different from the Intelligent Parking Assist function. For example, when a request for parking assistance from the driver of the vehicle 10 is detected (for example, when a predetermined switch is operated), the parking assistance function may present on the display 53 an image of the vehicle 10 and the vicinity of the vehicle 10 captured from above (overhead view) to assist the driver in driving the vehicle 10 (specifically, in parking the vehicle 10 in the parking space).

In addition, the specific satisfaction condition related to the assistance device according to the second modification is satisfied when at least one of the conditions (1a) to (1d) is satisfied. However, part of the conditions (1a) to (1d) may be omitted.

Alternatively, it may be determined that the specific satisfaction condition is satisfied when two or more of the conditions (1a) to (1d) are satisfied. Further, the specific cancellation condition related to the assistance device according to the second modification is satisfied when at least one of the condition (2a) and the condition (2b) is satisfied. However, one of the condition (2a) and the condition (2b) may be omitted.

The driving assistance ECU 22 of the assistance device according to the second modification may be configured not to provide part of the driving assistance functions of the functions 2 to 4. Further, the condition (1c) related to the assistance device according to the second modification is satisfied when the vehicle 10 moves backward even once. However, the driving assistance ECU 22 of the assistance device according to the second modification may determine that the condition (1c) is satisfied when the vehicle 10 repeats the backward movement and the forward movement a predetermined number of times within a predetermined time.

What is claimed is:

1. A driving assistance device comprising:
an information receiver configured to receive information required for estimation of an other vehicle predicted route, the other vehicle predicted route being a predicted traveling route of another vehicle, from the other vehicle through wireless communication; and
an electronic control unit configured to
acquire a host vehicle predicted route, the host vehicle predicted route being a predicted travel route of a host vehicle, based on information about a position of the host vehicle and a traveling state of the host vehicle,
acquire the other vehicle predicted route based on the information received by the information receiver;
provide a warning to a driver of the host vehicle when the host vehicle predicted route and the other vehicle predicted route intersect each other, and prohibit the electronic control unit from providing the warning when determining that a predetermined parking lot traveling condition is satisfied, the predetermined parking lot traveling condition being a condition that is satisfied when the electronic control unit determines that the host vehicle is likely to be traveling in a parking lot.

2. The driving assistance device according to claim 1, further comprising
a radar configured to acquire information about an object around the host vehicle, wherein
the electronic control unit is configured to determine whether there is a route obstacle based on the information about the object, and to determine that the predetermined parking lot traveling condition is satisfied when determining that there is the route obstacle, the route obstacle being an object that interferes with traveling of the host vehicle to a route intersection point where the host vehicle predicted route and the other vehicle predicted route intersect each other.

3. The driving assistance device according to claim 1, further comprising
a map database configured to store map information including information for specifying a range of the parking lot, wherein
the electronic control unit is configured to determine whether the position of the host vehicle is included in the range of the parking lot based on the map information, and to determine that the predetermined parking lot traveling condition is satisfied when determining that the position of the host vehicle is included in the range of the parking lot.

4. The driving assistance device according to claim 1, wherein the electronic control unit is configured to determine that the predetermined parking lot traveling condition is satisfied after a predetermined specific satisfaction condition is satisfied until a predetermined specific cancellation condition is satisfied, the predetermined specific satisfaction condition being a condition that is satisfied in at least one of a case where the host vehicle is likely to be entering the parking lot and a case where the host vehicle is likely to be located in the parking lot.

5. The driving assistance device according to claim 4, wherein
the electronic control unit is configured to provide at least one of a parking assistance function and an obstacle detecting function, the parking assistance function being a function of executing a parking assistance process to assist the host vehicle in moving to a parking space, the obstacle detecting function being a function of executing a nearby obstacle warning process to notify the driver of a presence of the nearby obstacle when the nearby obstacle with which the host vehicle is likely to collide is detected at least while the host vehicle is moving toward the parking space, wherein
the electronic control unit is configured to determine that the predetermined specific satisfaction condition is satisfied when at least one of a condition that is satisfied when the electronic control unit executes the parking assistance process and a condition that is satisfied when the electronic control unit executes the nearby obstacle warning process is satisfied.

6. The driving assistance device according to claim 4, wherein the electronic control unit is configured to determine that the predetermined specific satisfaction condition is satisfied when the host vehicle moves backward.

* * * * *

UNITED STATES PATENT AND TRADEMARK OFFICE
CERTIFICATE OF CORRECTION

PATENT NO. : 10,933,890 B2  
APPLICATION NO. : 16/733830  
DATED : March 2, 2021  
INVENTOR(S) : Kazunari Aoki Page 1 of 1

It is certified that error appears in the above-identified patent and that said Letters Patent is hereby corrected as shown below:

On the Title Page

Item [73], "TOYOTA JTDOSHA KABUSHIKI KAISHA, Toyota (JP)" and insert -- TOYOTA JIDOSHA KABUSHIKI KAISHA, Toyota-shi, Aichi-ken (JP) --

Signed and Sealed this  
Eleventh Day of May, 2021

Drew Hirshfeld  
*Performing the Functions and Duties of the*  
*Under Secretary of Commerce for Intellectual Property and*  
*Director of the United States Patent and Trademark Office*